United States Patent
Lim et al.

(10) Patent No.: US 9,015,145 B2
(45) Date of Patent: Apr. 21, 2015

(54) METHOD AND APPARATUS FOR AUTOMATIC CONFIGURATION OF META-HEURISTIC ALGORITHMS IN A PROBLEM SOLVING ENVIRONMENT

(75) Inventors: Meng Hiot Lim, Singapore (SG); Yi Liang Xu, College Station, TX (US); Yew Soon Ong, Singapore (SG)

(73) Assignees: Singapore Technologies Dynamics Pte Ltd., Singapore (SG); Nanyang Technological University, Singapore (SG)

( * ) Notice: Subject to any disclaimer, the term of this patent is extended or adjusted under 35 U.S.C. 154(b) by 954 days.

(21) Appl. No.: 12/519,953

(22) PCT Filed: Dec. 22, 2006

(86) PCT No.: PCT/SG2006/000403
§ 371 (c)(1), (2), (4) Date: Jun. 18, 2009

(87) PCT Pub. No.: WO2008/079097
PCT Pub. Date: Jul. 3, 2008

(65) Prior Publication Data
US 2010/0106714 A1 Apr. 29, 2010

(51) Int. Cl.
*G06F 17/30* (2006.01)
*G06N 3/12* (2006.01)

(52) U.S. Cl.
CPC ............ *G06N 3/12* (2013.01); *G06F 17/30424* (2013.01)

(58) Field of Classification Search
CPC .................. G06F 17/30424; G06F 17/3053; G06F 17/30; G06F 3/0237; G06F 19/24; G06N 3/12

USPC .................. 707/718, 797, 829, E17.017, 856, 707/999.002, 999.102, 748, 712, 736; 706/12–13, 21, 47, 11, 15, 20, 25, 46, 706/48, 52

See application file for complete search history.

(56) References Cited

U.S. PATENT DOCUMENTS 5,867,397 A 2/1999 Koza et al.
6,086,617 A 7/2000 Waldon et al.
(Continued)

FOREIGN PATENT DOCUMENTS

JP 11-039275 A 2/1999
WO WO 2007/070012 A1 6/2007

OTHER PUBLICATIONS

"CodeBetter.com" raymondlewallen, "Software Development Life Cycle Models", CodeBetter.com, p. 1-5, Jul. 13, 2005 http://codebetter.com/raymondlewallen/2005/07/13/software-development-life-cycle-models/.*

(Continued)

*Primary Examiner* — Jacob F Bétit
*Assistant Examiner* — Amanda Willis
(74) *Attorney, Agent, or Firm* — Faegre Baker Daniels LLP

(57) ABSTRACT

A method and system are presented for configuring a search algorithm for solving a combinatorial optimization problem. The search algorithm has a number of procedural components. Each procedural component is configured using a respective data structure. The data structure has a tree structure, including traversal split nodes, each of which represents a choice to be made when configuring the procedural component of the search algorithm. Configuring the procedural component corresponds to traversing the tree structure, and the traversal is performed automatically. At each of the traversal split nodes, the choice of which direction to take through the tree structure is made randomly, using a respective probabilistic function. Thus, a population of candidate algorithms is generated. These are evaluated, and the probabilistic functions modified.

14 Claims, 12 Drawing Sheets

(56) References Cited

U.S. PATENT DOCUMENTS

| | | | |
|---|---|---|---|
| 6,263,325 B1 | 7/2001 | Yoshida et al. | |
| 6,286,017 B1 | 9/2001 | Egilsson | |
| 6,327,582 B1 | 12/2001 | Worzel | |
| 6,360,191 B1 | 3/2002 | Koza et al. | |
| 6,532,453 B1 | 3/2003 | Koza et al. | |
| 6,687,685 B1* | 2/2004 | Sadeghi et al. | 706/15 |
| 2003/0167265 A1* | 9/2003 | Corynen | 707/4 |
| 2004/0111420 A1* | 6/2004 | Hofstee et al. | 707/100 |

OTHER PUBLICATIONS

Francq, Pascal Optimization Problems, Apr. 20, 2011, pp. 1-5, http://www.otlet-institute.org/wikics/Optimization_Problems.html#toc-Section-1.*

Maniezzo, V. and Carbonaro, A., "Ant Colony Optimization: an Overview", Jun. 1999 (retrieved on Feb. 22, 2007). pp. 1-20, Retrieved from the internet <URL: http:///www.csr.unibo.it/~maniezzo/papers/antstutorial.ps>.

Stützle, T. and Hoos, H.H., "Max-Min Ant System", (retrieved on Feb. 23, 2007), pp. 1-38, Retrieved from the internet <URL: http://cs.ubc.ca/spider/hoos/Publ.fgcs00.ps.gz>.

Botee, H.M. and Bonabeau, E., "Evolving Ant Colony Optimization", Advanced Complex Systems, 1998, vol. 1, pp. 149-159 (retrieved on Feb. 22, 2007) Retrieved from the internet <URL: http://jmvidal.cse.sc.edu/822/papers/99-01-009.ps>.

Gutjahr, W.J., "A Graph-based Ant System and its Convergence", Future Generation Computer Systems, vol. 16, Issue 9 (Jun. 2000), pp. 1-23 (retrieved on Feb. 23, 2007) Retrieved from the internet <URL: http://homepage.univie.ac.at/walter.gutjahr/papers/ants5.ps>.

International Search Report for PCT/SG2006/000403 issued by the Australian Patent Office on Mar. 6, 2007.

\* cited by examiner

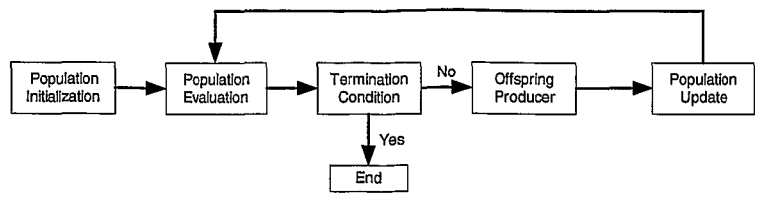
*Fig. 1A*
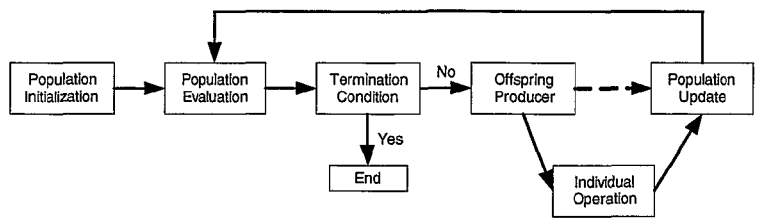
*Fig. 1B*
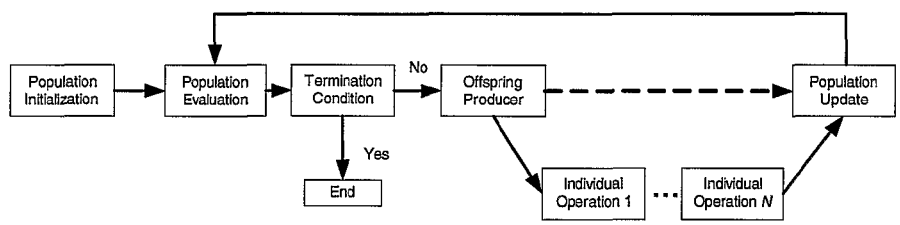
*Fig. 1C*
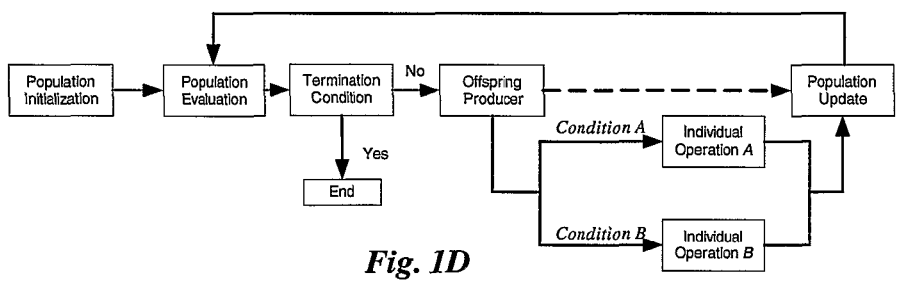
*Fig. 1D*
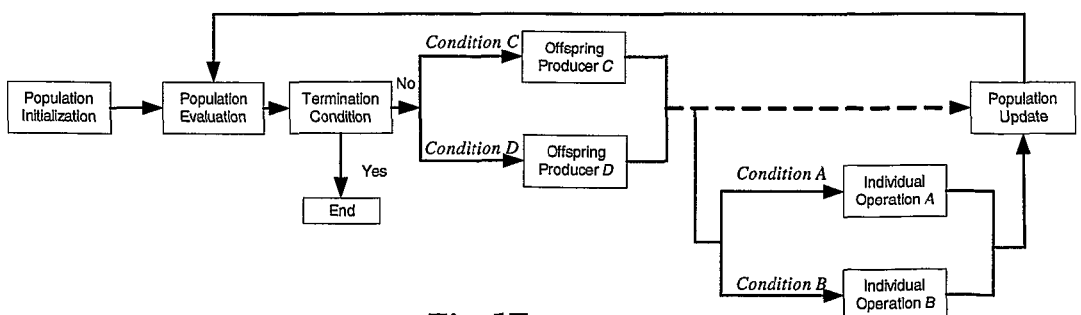
*Fig. 1E*
FIG.1

```
Procedure Training for Configuration Optimization

TraceInitialization(Trees);

do
        for i =1 to #PopSize
            AlgorithmPop[i] = ConfigureAlgo(Trees);
            EvaluateAlgo(AlgorithmPop[i], TraningSet);
        end
        UpdateTrace(Trees, AlgorithmPop[best]);
    while (TerminationCondition() == TRUE)

return (Trees)

end
```

FIG. 9

METHOD AND APPARATUS FOR AUTOMATIC CONFIGURATION OF META-HEURISTIC ALGORITHMS IN A PROBLEM SOLVING ENVIRONMENT

CROSS-REFERENCE TO RELATED APPLICATION

This application is a U.S. National Phase Application of PCT International Application No. PCT/SG2006/000403, filed on Dec. 22, 2006, which is expressly incorporated by reference herein.

RELATED APPLICATIONS

The present application is related to another international patent application entitled "Method and Apparatus for an algorithm development environment for solving a class of real-life combinatorial optimization problems", PCT/SG2006/000382.

FIELD OF THE INVENTION

The present invention relates to a software tool for automatically configuring a search algorithm for carrying out optimization within the realm of an application domain. More specifically, the invention relates to a problem solving environment that incorporates an evolutionary learning methodology for optimizing the design and configuration of meta-heuristics for solving various complex combinatorial optimization problems.

BACKGROUND OF THE INVENTION

Many real-life scenarios of problem-solving involve searching for an optimum combination or permutation of entities. The number of combinations although finite is usually very large to the extent that trying out all possible combinations is not an option. In the field of computer science, such problems are said to be computationally intractable and the process of searching is generally referred to as combinatorial optimization. Exact enumerative approaches tend to yield solutions of poor quality not withstanding the fact that the search process may incur high computational cost. Therefore, a class of stochastic algorithms, in particular, meta-heuristics, is useful for such combinatorial optimization problems. These are approximate methods with capacity to guarantee good quality solutions in reasonable time.

However, in order to fully capitalize on the potential capacity of meta-heuristics to solve real-life problems, one is required to have profound knowledge of algorithm design and coding, as well as domain-specific knowledge of the problems being addressed. Moreover, users may have different requirements and expectations on the performance of the algorithm according to different real-life scenarios. These may lead to significant differences in algorithm design and configurations. Without the necessary expertise of algorithm design, it is unlikely that an algorithm with satisfactory performance can be achieved.

Problem-solving environments with various optimization techniques including genetic algorithms have previously been presented. See U.S. Pat. Nos. 6,263,325, 6,086,617, Epogy Process Integration and Design Optimization Software, and the optimization software called Hierarchical Evolutionary Engineering Design System (HEEDS) software. These systems provide user-friendly interfaces for exploring various optimization tools for solving different optimization problems. This class of platforms facilitates the process of algorithm design and thus enhances the efficiency of problem-solving greatly. However, these software tools are essentially simulation environments. Though various algorithms can be configured and executed efficiently in these environments, the execution depends on the entire system. For many applications which require an embedded real-time solver, this class of environments does not offer the flexibility to configure an efficient stand-alone program, albeit a turnkey problem-solving algorithm.

In U.S. Pat. No. 6,286,017, a graphical environment is presented which assists users in generating a stand-alone application rapidly. It contains a modular library, which is managed by spreadsheet, and adopts other software re-use technology. Users are able to retrieve procedures from the library with the friendly GUI it provides. Based on the procedures selected, a stand-alone application is generated automatically. However, this invention only addresses the programming issue. It does not involve any algorithm design knowledge. Therefore, it may not meet the needs of solution methodology when complex algorithms like meta-heuristics need to be developed.

TOMLAB is a general optimization environment in MATLAB. It is essentially a MATLAB toolbox, which encapsulates various optimization procedures, including complex meta-heuristics like genetic algorithms. It supposedly makes it easier for users to retrieve the integrated procedures and routines to build up an application in the form of source codes. However, it cannot generate source codes automatically and the user has to deal with a functional programming language, i.e. MATLAB programming language. This is a big obstacle for users who may not be familiar with MATLAB language. Furthermore, it requires the support of an expensive third party software environment, i.e. MATLAB.

Easy Specification of Evolutionary Algorithm (EASEA) is a high-level script language dedicated to the specification of evolutionary algorithms (EA). It retrieves various EA procedures and routines from well-known EA libraries: GALib and EQ. Users compose the .ez file in EASEA language for configuring an evolutionary algorithm. The .ez file is then compiled by EASEA compiler to C++ files. The generated C++ files are in turn compiled and linked with the corresponding library to produce an executable file implementing the evolutionary algorithm specified in the original .ez file. This way, the most tedious codes generation job in algorithm development is avoided. Therefore the efficiency of application development is enhanced significantly. However both EASEA and another similar language, Evolutionary Algorithm Modeling Language (EAML), are still forms of text-based language, although they are higher level than any functional programming language. These two script languages both require a specifically designed compiler to translate the script language to a functional programming language. Furthermore, it is necessary for general users to be familiar with the syntax of the language.

An important point to be made is that none the prior arts introduced above address the issue of automatically configuring an algorithm that is optimal for a given class of problems that it is intended to solve. The quality of the resulting solution method depends very much on the experience and the expertise of the programmer or system' developer. More importantly, there are no mechanisms for learning based on samples of test problems.

In the technical paper of M. Birrattari, et al. (2002), a racing algorithm was proposed for configuring the parameters of meta-heuristics. Though the resulting ACO algorithm is human competitive, this proposed racing algorithm is only able to tune real number parameters in the meta-heuristics and it fails to address other configurations issues, like structures, procedure selections and so on.

In the technical paper of K. O. Stanley et al. (2005), an evolutionary system, namely NERO, was proposed. It encodes the neural networks as artificial chromosomes and uses a genetic algorithm to evolve the chromosomes (i.e. neural networks) for the purpose of a real-time game. It optimizes not only the parameter settings, but also the topological structures of the neural networks. It is also able to adjust the neural networks according to dynamic changes of the game scenarios in real time. NERO achieves human competitive results and addresses the needs of quick generation of complex systems (i.e., neural networks in this case) with excellent performance. However, NERO is dedicated to neuro-evolution. It does not address the issue of evolving other general meta-heuristic algorithms for a wider scope of problem-solving needs.

In U.S. Pat. Nos. 5,867,397, 6,360,191 and 6,532,453, J. Koza proposed a novel problem-solving technology, namely genetic programming. It encodes a solution method or system (codes of a computer program) into a tree based artificial chromosome and then adopts the operations in genetic algorithm to evolve the chromosomes (i.e. the solution methods program). Genetic programming not only optimizes the parameter settings, but also the structures of the solution method for a given problem. Genetic programming has successfully produced many human-competitive results in a very wide range of real-life applications. However so far, it has only proven applicable to relatively simple systems, like curve-function approximation, RLC circuits design or even a programming problem as issued in U.S. Pat. No. 6,327,582. It does not address the need of automatic configuration of meta-heuristic algorithms for general optimization purposes in real-life applications.

SUMMARY OF THE INVENTION

The configurations of an algorithm (e.g. meta-heuristics) including parameters setting, structure, procedures, procedures coupling, hybridization compatibility, etc., can have significant effects on the performance of the resulting algorithm. Coupled with the fact that users may have various requirements and expectations of the performance of the desired algorithm such as efficiency, robustness, stability, etc., the process of configuring an appropriate search algorithm can be time-consuming. On the other hand, to derive optimized hand-crafted algorithms, especially for complex meta-heuristic algorithms, requires thorough understanding and familiarity with the class of algorithms being addressed. Furthermore; it often requires profound experience, cumulative expertise, and even sometimes instinct, which are usually only acquired through many years of working in the related area. So far, human intelligence and creativity play a dominant role in designing meta-heuristics within a certain level of optimality in performance.

With these considerations in mind, there is a need to develop an artificial intelligence driven methodology to automatically optimize the configurations of complex algorithms for solving various classes of real-life problems.

In our corresponding application PCT/SG2006/000382 (which is unpublished at the present priority date) we propose an environment for configuring one or more procedural components of a search algorithm for solving at least one combinatorial-optimization problem. For each procedural component, the environment employs a corresponding data structure representing options for configuring the procedural component. The data structure is a tree structure of nodes representing respective choices which are to be made to configure the procedural component. A user is led through the tree structure node-by-node by a traversal algorithm, at each node making a selection between the available options. Some of the options include ones which determine which route the traversal algorithm takes through the tree structure. This makes possible a generic software system, which provides an open and friendly interface; enabling users to quickly configure an evolutionary algorithm based solution methodology and automatically optimize the configurations of the algorithm for solving a class of combinatorial optimization problems. The class of problems addressed is those where the solutions can be represented as permutation string structures.

The present invention relates in general terms to a development of the above scheme in which, instead of a user being required to make selections at each of the nodes, the choices are made automatically by a probabilistic algorithm. Multiple electronic traversals of the tree-structures are performed, each thus leading to a respective candidate search algorithm. An evaluation criterion is used to produce, for each of the resultant candidate search algorithms, a respective numerical quality index representing the quality of the resultant candidate search algorithm.

Preferably, the quality index is obtained using a training data set consisting of instances of the target optimization problem. During the configuration process, a candidate algorithm is evaluated based on its simulated performance level on the training set. The evaluated quality of the solution(s) may optionally take into account other desired performance considerations. Such considerations may include parameters that dictate the efficiency, effectiveness, robustness or stability of the desired search algorithm. The search algorithm including the corresponding configuration is used in a search algorithm for solving the set of test problems, and the quality of the solution(s) the candidate algorithm produces is evaluated. The evaluated quality of the solution(s) may optionally take into account other desiderata, such as ones specified by the user.

Preferably, each probabilistic selection function is defined by a set of one or more numerical trace values. Typically, at least one set of trace values defines a probabilistic function for choosing which option among a plurality of routing options is selected in the traversal algorithm. Typically, at least one set of trace values defines a probabilistic function for selecting a numerical parameter, e.g. from one of a set of pre-defined options (as described below, this too may be considered as a routing option, if each of the possible numerical parameter values is considered as a node).

The steps described above are preferably performed multiple times, trying out different respective choices for the set of trace values. For each set of trace values, the respective quality indices of one or more of the candidate search algorithms it produces are evaluated to produce a trace value quality index, representing the quality of the set of trace values.

The trace value quality index may be used as the quality function of an optimization algorithm. Successive sets of trace values are selected by this optimization algorithm, based on previously generated sets of trace values and their corresponding trace value quality indices. The optimization algorithm may, for example, be a genetic algorithm, but other well-known optimization algorithms may also be suitable.

Thus, the invention in one aspect makes possible a novel evolutionary learning methodology for automatically optimizing the configurations of the meta-heuristics for the class of combinatorial optimization problems being addressed.

Users or system integrators with no profound background knowledge and experience on meta-heuristic algorithms design may use preferred embodiments of the present invention to automatically search for the optimal configuration of a meta-heuristic algorithm (including in certain embodiments optimized program structure, parameter tuning, procedure selection and so on), for solving a class of combinatorial optimization problems.

Users first select some sample problems as the training set from a class of problems being addressed. Users may specify expected characteristics of the algorithm beforehand in terms of efficiency, effectiveness, robustness, stability or any other performance considerations. As discussed, embodiments of the present invention have the capability to learn from the training set, adapting its internal context, iteratively training itself to produce algorithms with progressively better performance. Once users are satisfied with the performance of the best-found algorithm, they generate the source codes of the algorithm as a stand-alone program, which can serve as the problem-solving optimization algorithm for the class of problems used in training or any other similar problems. This way, the effort for algorithm optimization and generation is minimized significantly. The quality and efficiency of the algorithm developed and the problem-solving capacity of general users may be enhanced dramatically.

BRIEF DESCRIPTION OF THE DRAWINGS

Embodiments of the invention will now be described for the sake of example only with reference to the following drawings, in which:

FIG. 1, which is composed of FIGS. 1A to 1E, shows the respective flowcharts of various forms of genetic optimization algorithms (or hybrid genetic algorithms) including procedural components which may be configured by embodiments of the present invention.

FIG. 9 shows schematic code implementing a training procedure performed by the embodiment of the present invention.

DETAILED DESCRIPTION OF PREFERRED EMBODIMENTS

Figure 2:
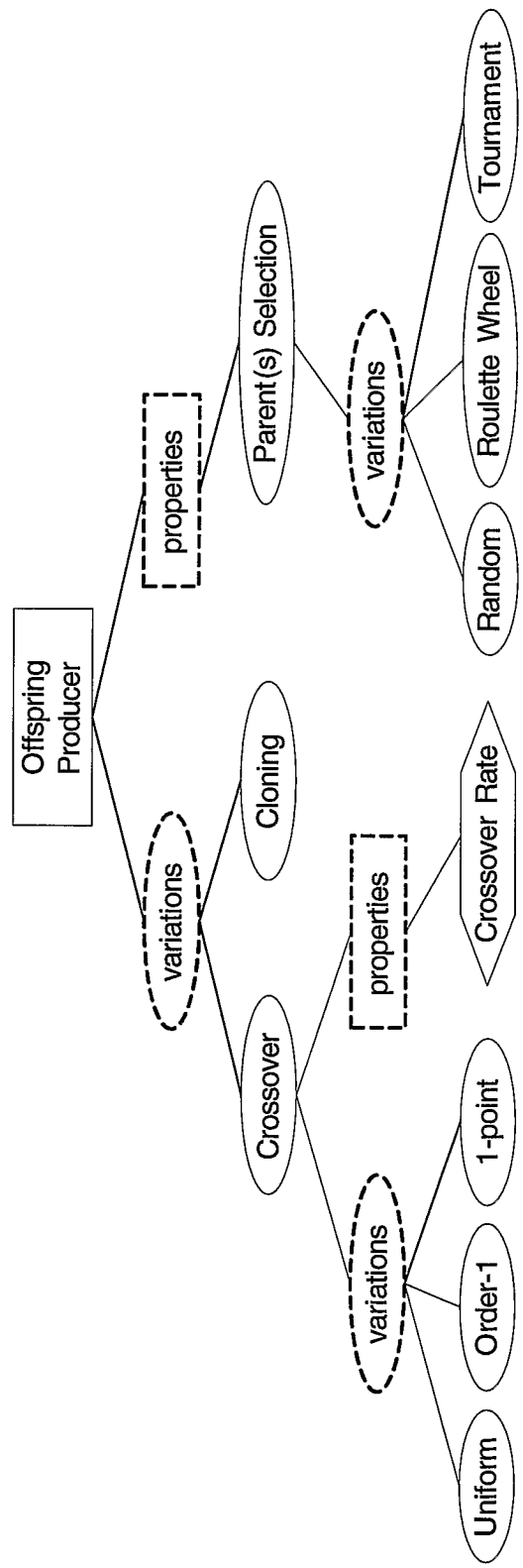
FIG. 2 shows the hierarchical tree structure for the component Offspring Producer, as used by an embodiment of the present invention.

The following description is in terms of the class of meta-heuristic algorithms which are applied to solve combinatorial optimization problems with permutation solution structure. This refers to domain problems whereby the possible solution can be coded as a permutation string. It is worth noting that, though we focus on the permutation representation problems, the methodology in the present invention is representation-independent and thus can be extended and applied to other solution representations, such as a binary string or real numbers etc.

(i) Meta-heuristic Algorithms

The meta-heuristic algorithms presently described may be represented by flowcharts, which consist of various procedure modules. FIG. 1, which is composed of FIG. 1A to 1E, shows flowcharts for some five genetic algorithms (GA) or hybrid-GA to which the invention can be applied. Any genetic algorithm can be divided into three components from a structural viewpoint: genetic representation, genetic operations and fitness function. The present invention focuses on the permutation-based optimization problems. The artificial chromosomes coded as permutation strings are generated automatically. All the genetic operations, like crossover and mutation, are specifically designed for handling permutation strings. These operations tend to be standard features common to most GA-based problem-solving. They are usually problem-independent, though different operations may lead to performance that varies with problems.

All of the flowcharts of FIGS. 1A to 1E employ procedural components selected from among six basic procedural components.

Referring firstly to FIG. 1A, the first step of the GA algorithm illustrated is a Population Initialization procedural component, which produces an initial population of chromosomes. They follow a generation loop, in which these chromosomes are evaluated based on the fitness function. Subsequently, statistical information on the population is obtained through a Population Evaluation procedural component. It is then determined whether the termination criterion is met, using a termination condition procedure. After that, the population of individuals is designated as the parent generation. Using the Offspring Producer procedural component (e.g. crossover and/or cloning), the parents reproduce to create members of the offspring generation. Finally, following the Population Update mechanism, the resulting offspring generation together with the parents of the current generation, constitutes a new population of parent generation for further reproduction. This process is repeated until the termination condition is met.

FIG. 1B shows a similar GA, except that it includes an additional procedural component: Individual Operations (e.g. mutation and/or local search) which are applied to alter or improve the genetic composition of the existing members of the offspring generation.

FIG. 1C shows a variation in which the Individual Operations procedural component is performed N times.

FIG. 1D shows a variation in which there are multiple possible Individual Operations procedural components, and which is performed depends upon which of two mutually exclusive conditions A and B is met.

FIG. 1E shows a variation of the procedure of FIG. 1D in which there are also two options for the Offspring Producer' procedural component, and which is performed depends upon which of two mutually exclusive conditions C and D is met.

(ii) Data Structure for Configuring the Procedural Components.

In the flowcharts of FIG. 1, each procedural component is defined by a set of properties and attributes, such that tuning and testing the properties and attributes corresponds to configuring the procedural component. Singapore Patent Application No. 200508032-0 (which at present is unpublished) pertains to a user-driven methodology and framework for configuring meta-heuristic algorithms. The methodology employs a tree structure arranged according to the left variation-right property principle described as follows.

For example, FIG. 2 denotes the tree structure for the Offspring Producer component. It is used to generate the offspring individuals from the parent population for subsequent reproduction operations. The left child variations of the Offspring Producer in the form of a dashed line elliptical node serves as the root of the left subtree to denote the variations of its parent, i.e. Offspring Producer, (e.g. Crossover and Cloning etc.) while the dashed line rectangular block "propertied" serves as the right child is the root of the right subtree to indicate the common properties of all the variations of Offspring Producer, such as Parent(s) Selection. Similarly, the subsequent subtrees are managed and organized by the same structure. For example, as one of the variation of Offspring Producer, Crossover contains variations like Uniform Crossover, Order-1 Crossover, One-Point Crossover and so on, which are organized in its left subtree. Meanwhile, all these variations have one common feature, i.e., Crossover Rate, a real number parameter represented as a hexagonal block. Therefore, it is denoted as a node in the right subtree of Crossover. It is worth to note that the dashed line blocks "variation" and "property", also define the rule for configuring left and right subtrees in different ways. For "variation" subtree, user only needs to select one child node (i.e. one variation) and traverse the corresponding subtree of the child node. For "property" subtree, all the children need to be configured. This rule is recursively applied as the system guides a user to configure a feasible algorithm.

The hierarchical tree structure is open to accommodate other novel procedures or ideas for embellishment. The new procedures can be located at the same level as the existing procedures as their siblings. For example, other well-known or novel crossover operators, like partially matched crossover (PMX), can be easily introduced to the system by locating them as the siblings of the existing Uniform Crossover, Order-1 Crossover and One-point Crossover. Their corresponding attributes and features are managed using the same tree structure as mentioned earlier. Therefore, this structure allows for a system that is open and easily scalable.

Figure 3:
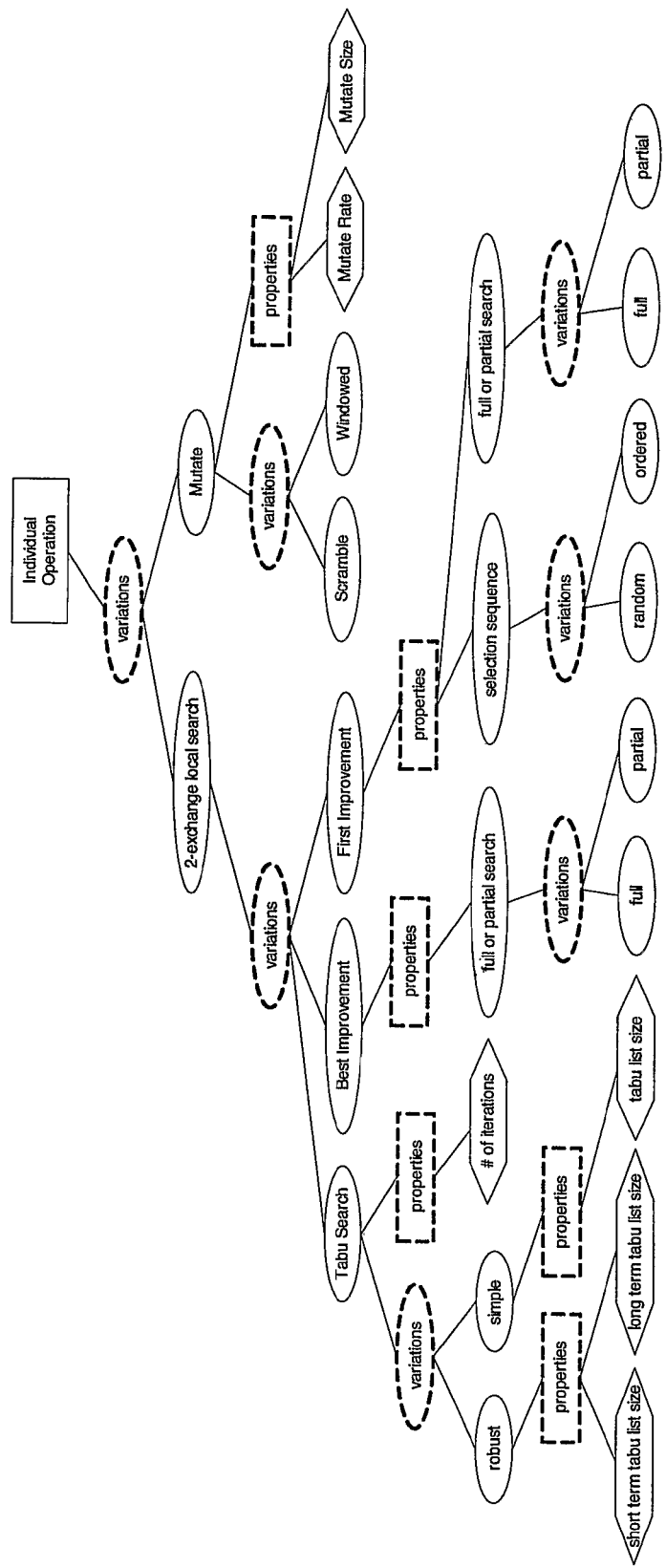
FIG. 3 shows the tree structure for the component individual Operation, as used by an embodiment of the present invention.

FIG. 3 shows the tree structure for the Individual Operation component. It is the set of procedures that are applied to an existing individual for improving its quality or altering its structure. We incorporate two forms of Individual Operation; 2-exchange local search and Mutation: Several variations of local search like tabu search as well as two forms of mutations (scramble mutation and windowed mutation) were incorporated. As stated above, any established or novel procedures can be introduced by following the left variation-right property rules.

Figure 4:
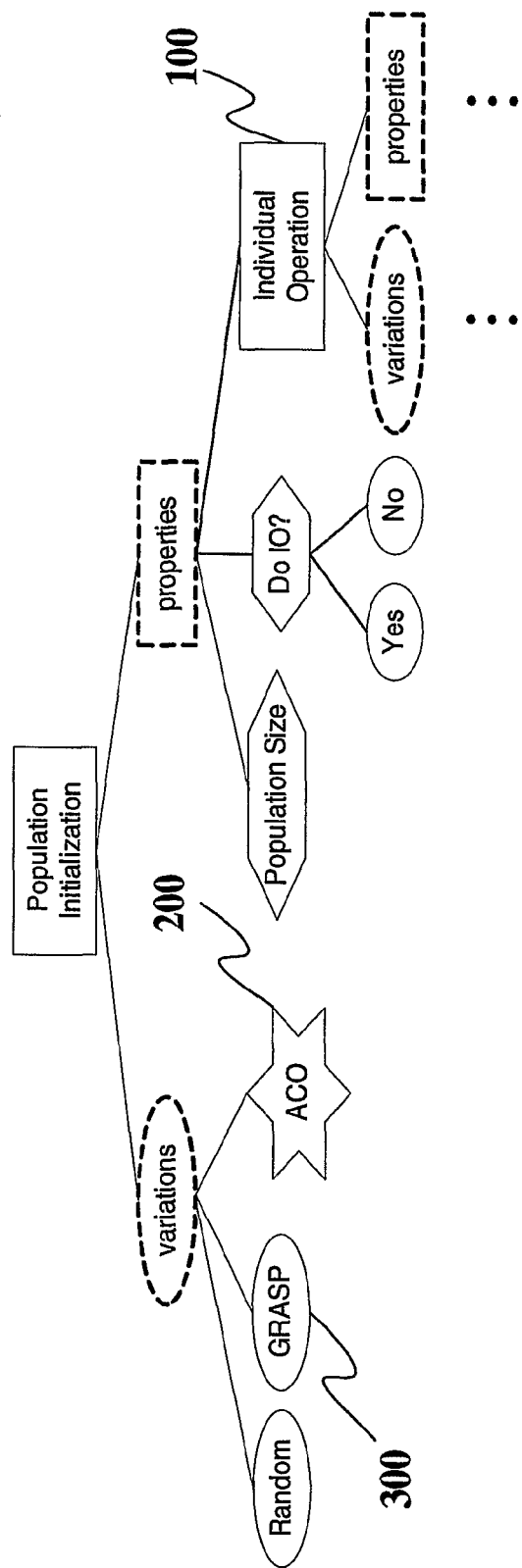
FIG. 4 shows the tree structure for the component Population Initialization, as used by an embodiment of the present invention.

FIG. 4 shows the tree structure for the Population Initialization component of GA module. A genetic algorithm starts with an initial population to be designated as the parents. The Population Initialization procedure is responsible to generate such initial population. In this component, population size, an important GA parameter, is specified. There are three initialization mechanisms available: Random Initialization, Greedy Randomized Adaptive Search Procedure (GRASP) and Ant Colony Optimization (ACO).

We have tested the tree-structure environment on a well-known class of combinatorial optimization problems, namely Quadratic Assignment Problem (QAP). Therefore, the GRASP procedure (item 300) implemented is the one described in Li et. al., 1994 for solving QAP, while item 200 represents an independent instance of ACO procedure. This way, the tree structure provides users the option to hybridize GA with ACO in an intuitive manner.

Since the quality of the initial samples of individuals can have significant impact on the performance of the entire genetic algorithm (or hybrid-GA), it is common to apply some sort of heuristics based local search to improve the quality of the initial group of individuals. The environment provides users the option to apply Individual Operation on the initial population of individuals. It is worth noting that item 100 in FIG. 4 is an independent instance of Individual Operation. The configuration of it can be different from that of the Individual Operation in the generation loop in FIG. 1 (if any). We omit the structure of this subtree in FIG. 4 which has been presented in detail by FIG. 3.

Figure 5:
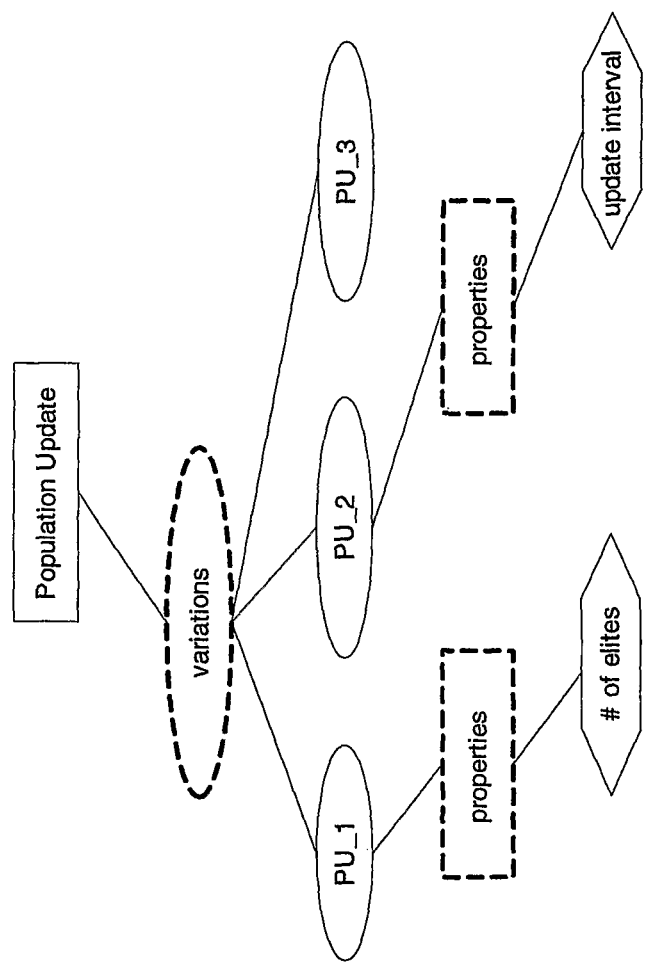
FIG. 5 shows the tree structure of the component Population Update, as used by an embodiment of the present invention.

FIG. 5 shows the tree structure of the block Population Update of GA module. It is used to determine which offspring should be accepted into the selection pool for further reproduction of the next generation. The three schemes are shown as subtrees and a brief explanation of each scheme follows:

PU_1: Overlapping population replacement with a certain number of elites (# of elites).

PU_2: Once a certain number (update interval) of offspring are produced, only the best chromosomes from both parents and offspring are accepted and added into the selection pool. It is also often called truncation selection.

PU_3: Only the child that is better than the worst existing parent and different from members in the existing population is accepted.

The # of elites and the update interval are the properties and are set as real number parameters of PU_1 and PU_2 respectively.

Figure 6:
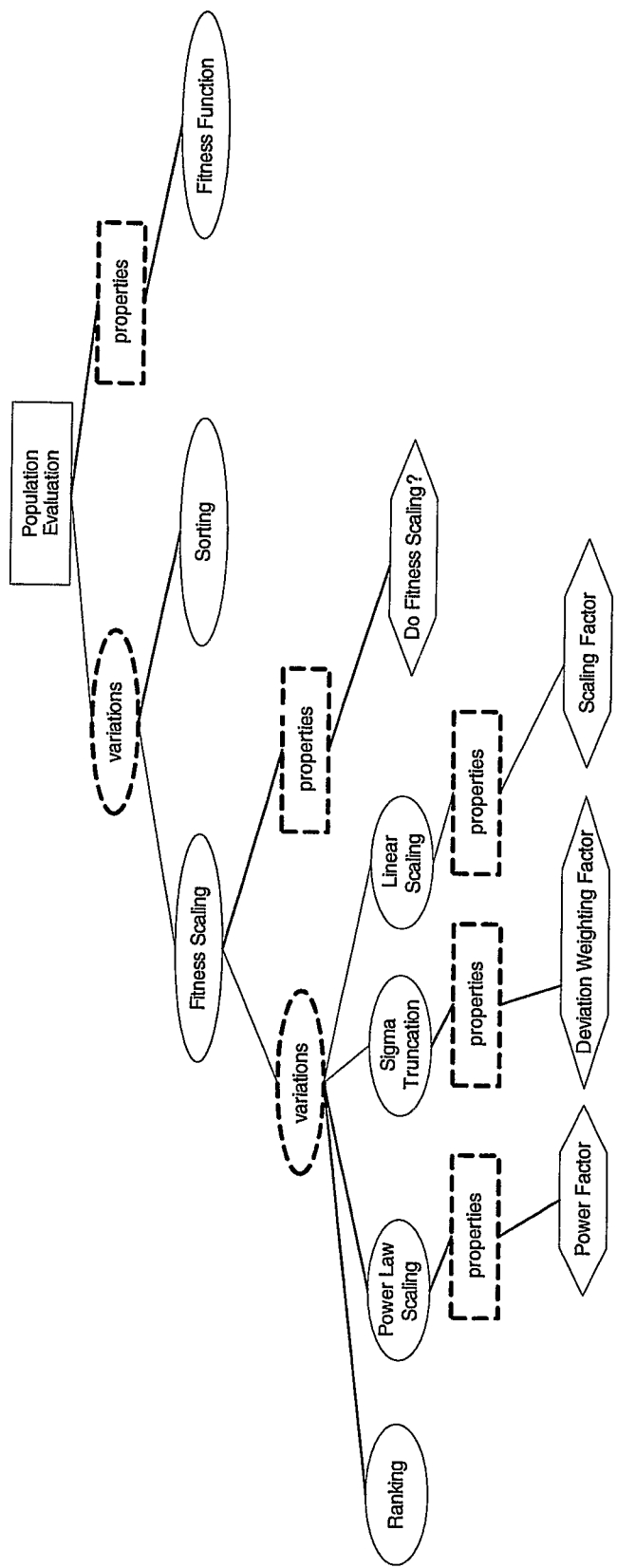
FIG. 6 shows the tree structure of the component Population Evaluation, as used by an embodiment of the present invention.

FIG. 6 shows the tree structure of the block Population Evaluation of GA module. It is used to evaluate the current parent population. Therefore, the Fitness Function, which is used to evaluate the fitness of an individual, is encapsulated in this component as its property. Besides, some pre-processing, like Fitness Scaling and Sorting, are often applied to the population of parent before reproduction starts. We introduced four types of well-known scaling methods: Linear Scaling, Sigma Truncation, Power Law Scaling and Ranking. Some of them are associated with real number parameters, which are set as properties associated to the corresponding methods of scaling.

Figure 7:
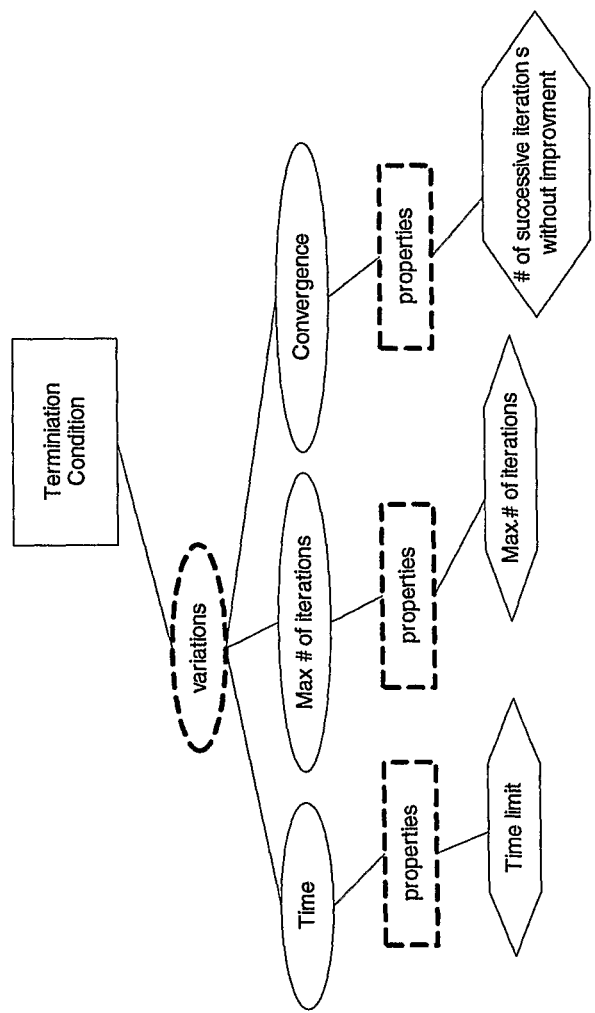
FIG. 7 shows the tree structure of the component Termination Condition, as used by an embodiment of the present invention.

FIG. 7 shows the tree structure of the block Termination Condition. It is used to control the modes of terminating the algorithm. We implemented three criteria: Time, Max # of iterations and Convergence. The time criterion terminates the algorithm when the user-defined computational time limit is reached, while the Max # of iterations criterion terminates the algorithm when the number of iterations reaches the user-specified number of generations. The Convergence criterion detects if the evolution converges by counting the number of successive iterations without any improvement in solution quality. Once the number exceeds a user-defined value, the evolution process is deemed to have converged and thus, is terminated.

With the module-based procedural library, which is managed by the hierarchical tree structures introduced above, users are free to explore various aspects of algorithm design. From FIG. 2 to FIG. 7, it is shown that, possible "features" associated to an algorithm that is being configured are located as the leaf nodes in the corresponding trees. This implies that the task of a user in determining an appropriate "feature" of an algorithm is essentially the process of finding a path from the root node to a particular leaf node in the corresponding tree. Therefore, the task of configuring a complete algorithm becomes a process of traversing the trees to find a set of paths starting from the root nodes to the leaf nodes, recursively applying the left variation-right property rule described above. In this environment, the depth-first mode of traversing is applied.

Figure 8:
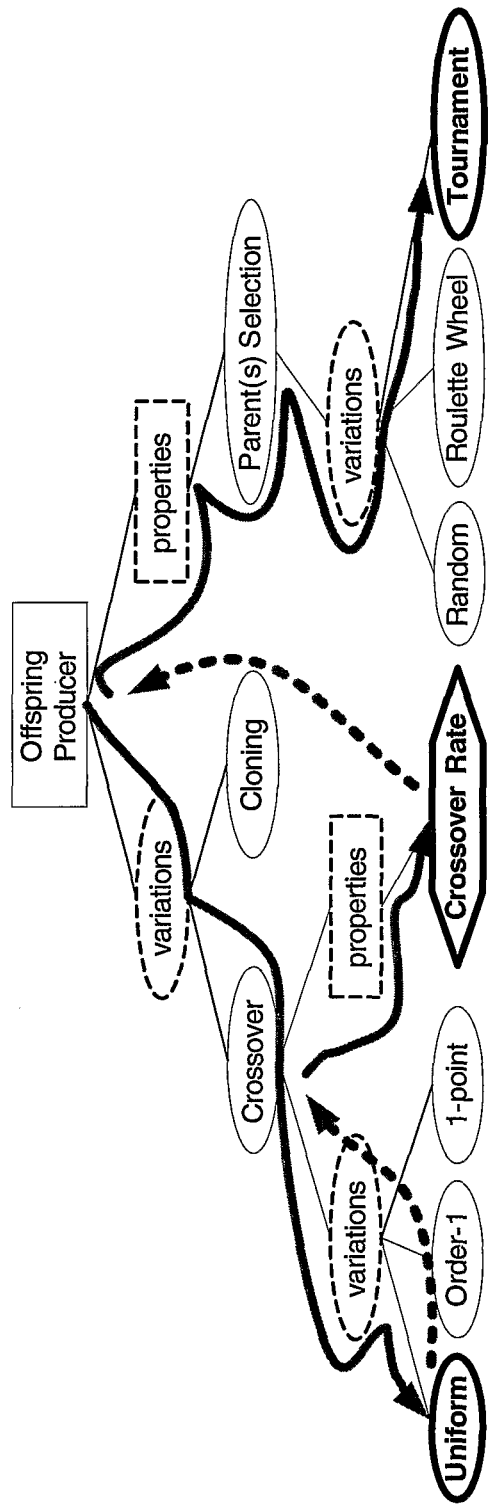
FIG. 8 illustrates the flow of a sample configuration for component Offspring Producer, as used by an embodiment of the present invention.

FIG. 8 illustrates the flow of a sample configuration of the component Offspring Producer. Starting from the root, it first traverses the variation (left) subtree of Offspring Producer. According to the left variation-right property rule, only one variation, for instance Crossover, is chosen. It then continues to traverse the corresponding subtree (Crossover). Due to the depth-first rule (inorder traversal, LVR mode), it traverses the variation (left) subtree of Crossover first. Assuming that the user chooses the Uniform crossover, it reaches the first leaf node, and continues to traverse the property (right) subtree of Crossover. Associated to it is a real number parameter Crossover Rate. After specifying the real value parameter for Crossover Rate, the flow proceeds to the second leaf node and goes on to traverse the property (right) subtree of Offspring Producer. Hereon, only the Parent(s) Selection feature remains to be configured. To do this, we start by traversing the variation (left) subtree of the Parent(s) Selection. Assuming that the user chooses Tournament out of the three variations of Parent(s) Selection available, it reaches the third leaf node. Since the property (right) subtree of Parent(s) Selection is empty, the traversal for this tree and the configuration of this component is accomplished. The traversal process described above covers three paths from the root node to three leaf nodes: Uniform, Crossover Rate and Tournament. This way, the user configures a feasible Offspring Producer instance, which is a form of uniform crossover with tournament parent selection methodology and a real number crossover rate. The configuration of other components of the algorithm can be similarly carried out to achieve a complete genetic algorithm driven search procedure.

It is worth noting that with this novel hierarchical tree structure, system developers are involved only in high level user-system interactions via a graphical user interface in the process of configuring algorithms to address a specific problem area. The variations of any genetic algorithm can be represented by a flowchart, which is derived based on the blocks from the six components described above. The configuration of each component can be carried out with the tree structure visualization. With such an approach, even novice users with limited algorithm design expertise are able to configure and design various genetic algorithms through very high level and intuitive graphical interface. This way, the efficiency of algorithm design is greatly enhanced.

After configuring the desired genetic algorithm, a user is able to use the codes generator of the present invention to generate the C++ source codes files based on the configuration he/she specified. The present invention adopts an object-oriented framework to facilitate codes generation functionality. Each node (except the "variation" and "property" nodes, which can be deemed as accessorial nodes) in the tree structure is regarded as an object (even for the real number parameter since it may have properties like range, precision, etc.) and is implemented as a class. For any object in the trees, its properties subtree members can be represented as the member variables of the class. The variation children can be realized as the subclasses of the parent (base class). The children may further have their own features, i.e. variations and/or properties, which can be similarly set as their super classes and/or member variables. From the descriptions above, the user-configuration information is stored in the tree structure. The rationale of the codes generator in this present invention is to follow the paths from the root to leaf nodes, defined by user-configuration, and then retrieve and generate the corresponding objects/classes in terms of .h files and .cpp files. All the generated files constitute a stand-alone program. It can be viewed as a genetic algorithm module for solving various real-life problems.

In summary, by means of the tree-structure methodology presented above, the generation of the generic operations, which is usually the most time-consuming part of the coding effort, is carried out automatically following the users' high-level specifications. Only the fitness function involves the problem's domain-specific information, and thus is problem-dependent. Fitness function is used to evaluate individuals based on the domain-specific knowledge of the problem being addressed. It plays a crucial role in guiding the GA to explore the entire solution landscape. It is also crucial in guiding the algorithm towards convergence to the optimum. The domain-specific information of a given problem can be exclusively stored in a special generated C++ object class. In principle, one only needs to manually implement the fitness function in the generated genetic algorithm module to customize it for solving a particular domain of problems. It is noted that, the blank module of the fitness function is also generated as a source codes placeholder. The user only needs to overwrite the function body of it to customize the algorithm for different problems. This way, the most time-consuming codes generation job in algorithm development is avoided. The effort for codes modification and customization is also minimized. Together with the high-level configuration process of algorithm design described above, it enhances the efficiency of the algorithm development significantly.

However though the methodology described above facilitates the configuration and generation process of the algorithm development, it does nothing to improve the quality of the resulting algorithm for the specific class of problems being addressed. The performance of the resulting algorithm still depends very much on the experience and expertise of the user. One without profound knowledge on the meta-heuristics design or the specific knowledge about problem domain may still face difficulty in designing and configuring a well-performing algorithm.

(iii) Automatic Configuration of the Search Algorithm by Employing the Tree Structure: an Embodiment of the Present Invention It is worth noting that in principle one way of uncovering the optimal configuration of an algorithm is to enumerate all the possible combinations of the root-leaf paths. However, time complexity of such an approach is not manageable. The embodiment of the invention is based on an evolutionary learning methodology to address the need for automatic configuration of the meta-heuristics for the class of problems being addressed. It is a desirable prerequisite that the algorithms configured through the process of evolutionary learning should be optimal or close to it.

The embodiment makes use of the concept of a "traversal split node", which is one at which a choice has to be made to configure the algorithm. As described above, the "variation" virtual nodes are examples of traversal split nodes, which determine a routing through the tree structure, e.g. from the root node to a given leaf.

Furthermore, the real number parameter nodes (such as "cross-over rate" in FIG. 2) also belong to the "traversal split nodes", since a decision on the specific value assigned to the parameter is required here. This can be made explicit by re-drawing the tree such that the various numerical options for setting the real number are set as nodes (leaf nodes) stemming from the parameter node. Thus, choosing one of the real number values for the parameter corresponds in the re-drawn tree to a selection of a corresponding one of the nodes stemming from the parameter node.

We put a trace value on each branch of a "traversal split node" to guide the decision-making. The traces can be viewed as the trace values of each branch. Given there are n number of branches stemming from a "traversal split node" and $\tau_{(i)}^j$ (i=1, 2, . . . ; j=1, 2, . . . , n) indicates the trace value of the j-th branch (choice) of the node at the iteration i. The decision of choosing a branch at iteration i is based on the trace values.

$$\text{Choice}(i) = \text{DesicionMake}(\tau_{(i)}^1, \tau_{(i)}^2, \ldots, \tau_{(i)}^n) \quad (1)$$

The function DecisionMake is normally a probabilistic function and it can have many variants. One possible form can be based on simple roulette wheel selection:

$$P_{(i)}^j = \frac{\tau_{(i)}^j}{\sum_{m=1}^{n} \tau_{(i)}^m} \quad (2)$$

where $P_{(i)}^j$ the probability of j-th branch being chosen at iteration i.

This way, the system is able to configure an algorithm by traversing the tree guided by the strength of the traces laid earlier.

Figure 12:
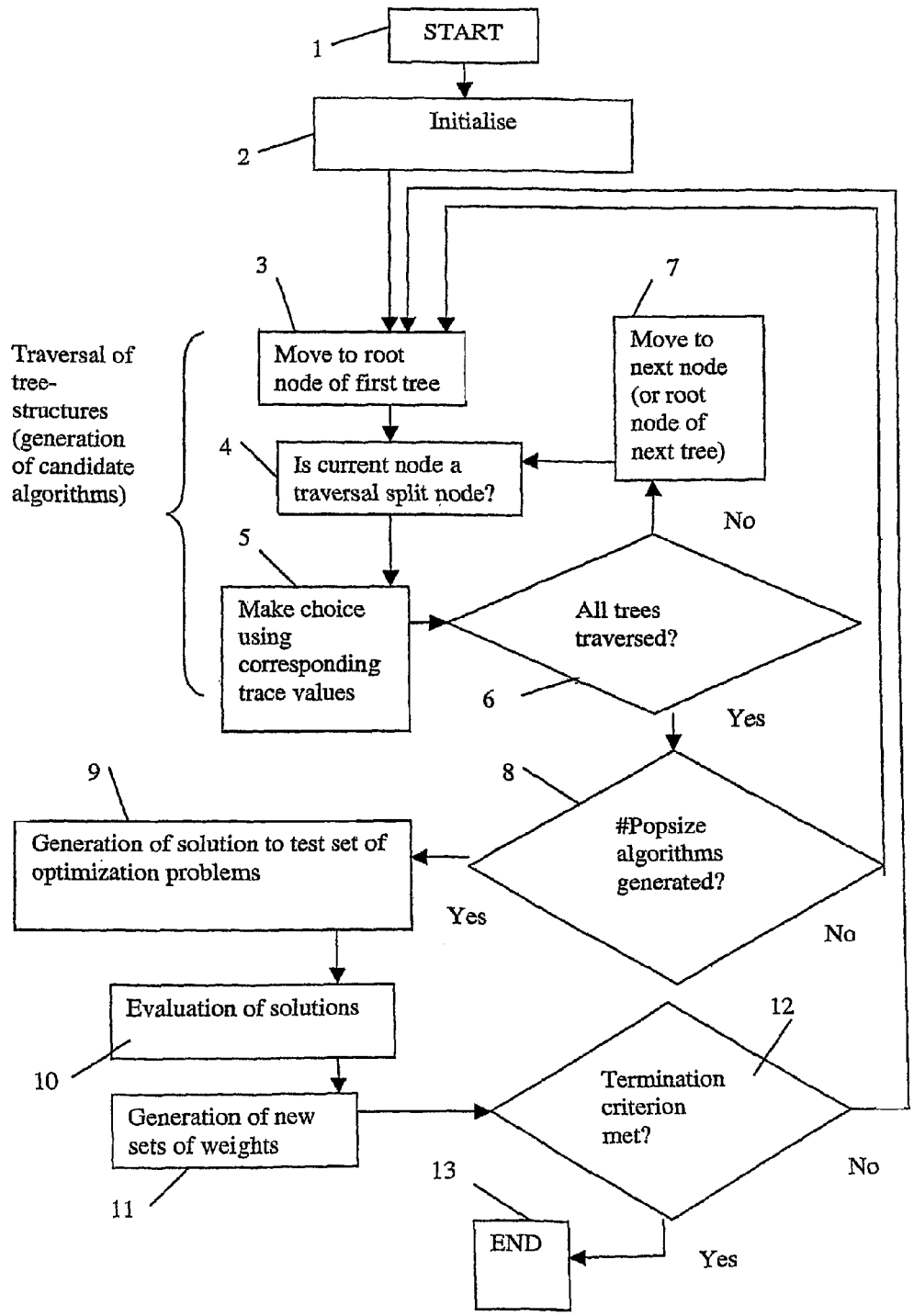
FIG. 12 is a flowchart of the embodiment of FIG. 9.

FIG. 9 shows schematic code for the training process of the automatic configuration. The corresponding flow diagram is shown in FIG. 12. The flow starts at step 1 ("START").

Figure 10:
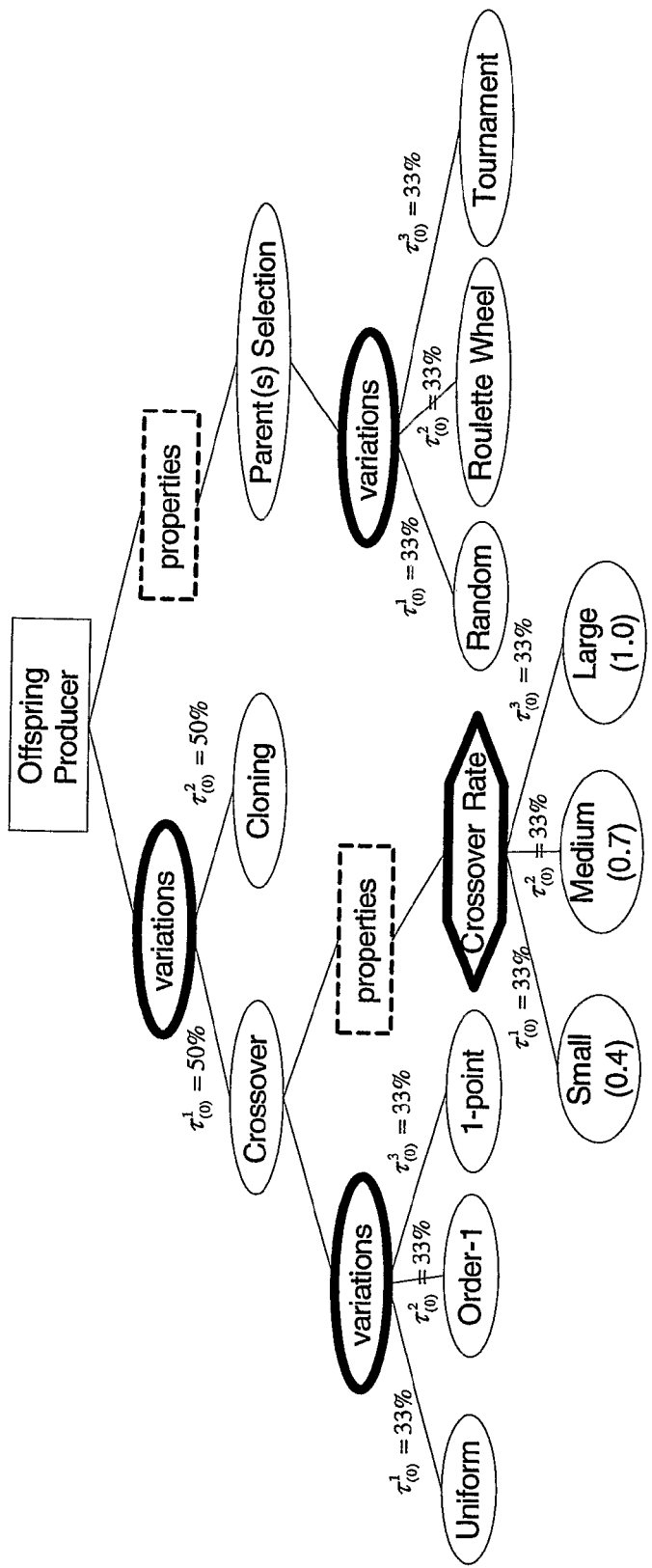
FIG. 10 shows an initialization of the traces in the Offspring Producer, employed by the embodiment of FIG. 9.

In step 2 of FIG. 12, the traces in the tree are initialized. Each branch of a "traversal split node" is assigned with a trace value. Typically, all are given the same initial trace value. The initialized tree-structure for the offspring producer procedure is shown in FIG. 10. Note that in FIG. 10, in contrast to FIG. 2, three pre-defined options for setting the real value parameter "crossover rate" are shown as respective leaf nodes (the options are to set the parameter as 0.4, 0.7 and 1.0). Thus, the node "crossover rate", which is a leaf node in FIG. 2, is visibly a traversal split node in FIG. 10.

Then in the evolutionary loop corresponding to the set of steps 3-7, the algorithm produces a candidate search algorithm (i.e. configuration of each of the procedural components) by traversing the tree, guided by the trace values as described above. That is, a respective configuration is produced for each of the procedural components of the candidate algorithm which is to be evaluated, thereby forming a candidate algorithm.

This process is repeated until it is determined in step 8 that the number of candidate algorithms produced is equal to #PopSize.

Figure 11:
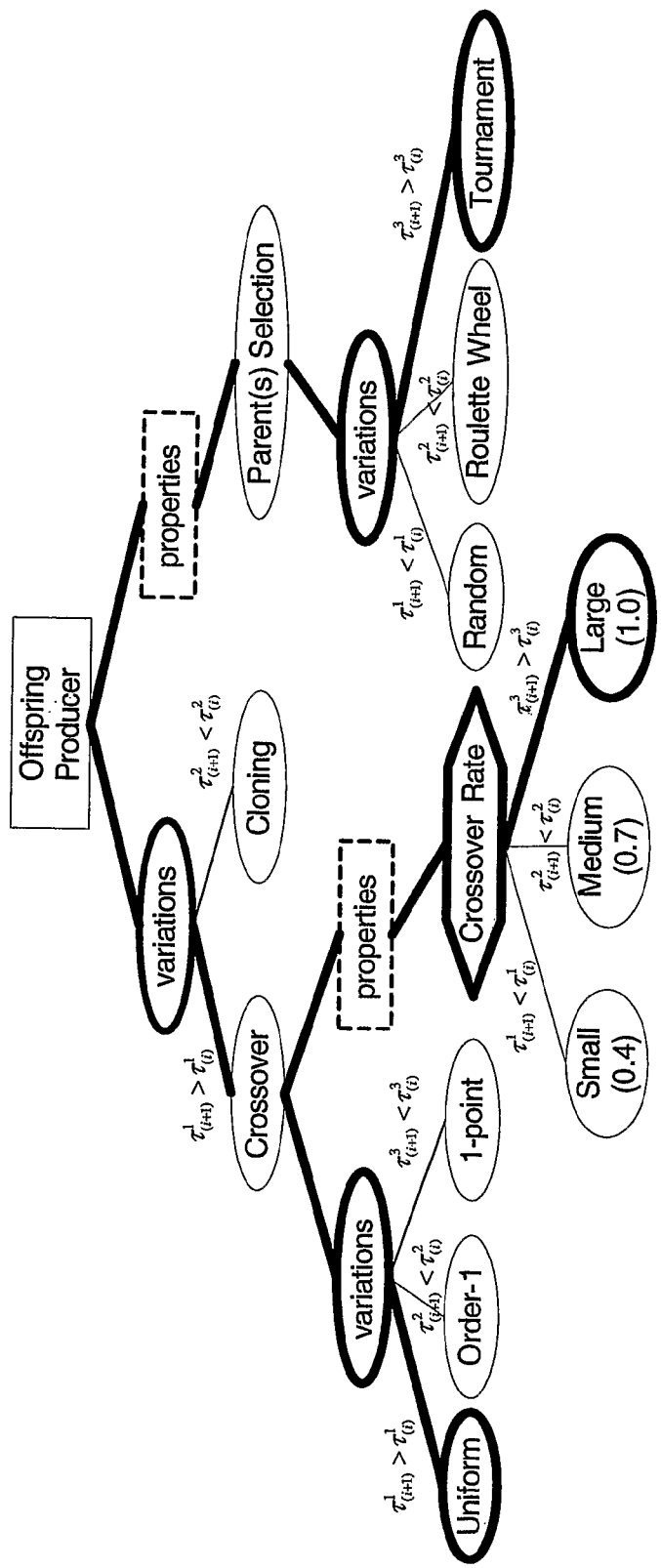
FIG. 11 shows the update of the traces in the Offspring Producer, produced by the embodiment of FIG. 9.

These algorithms are in turn evaluated in steps 9 and 10 by carrying out test runs on the training set, which consists of a number of sample instances of the target class of problems being addressed. The trace values in the tree are updated based on the best-performing few algorithms in the current iteration (step 11). It is then decided whether a termination condition is met (step 12). If not, the above steps (except the trace initialization) are repeated until the termination condition is met. If so, the algorithm terminates (step 13), and the tree with modified trace values are output as the result of the training process. FIG. 11 illustrates the process of trace update (i.e. step 11 of FIG. 12), taking as an example the procedural component Offspring Producer. It is assumed that in the previous iteration i the best-performing algorithm contained the configuration of Offspring Producer shown by the bold root-leaf paths in FIG. 11. We then increase the weight of the relative trace values along the paths that the configuration covers. Correspondingly, the relative values of the traces that the configuration does not cover may be reduced. This way, good configuration features are rewarded more chance of being selected in the next iteration and this preference is accumulated in a probabilistic and statistical manner as the evolutionary process progresses. Finally, the evolutionary process converges with a few root-leaf paths dominating the trees by large relative trace values along them. These paths, i.e. the configurations, constitute a good algorithm derived from training based on the target class of problems being addressed. Its quality is verified by carrying out test runs on instances of the optimization problem being addressed.

It is worth noting that users may have different requirements on the performance of the algorithm due to different real-life scenarios. These requirements and differences can be embodied in the way the system evaluates an algorithm (e.g., based on different measurement metrics). It is necessary to emphasize that the embodiment has the capacity to learn not only from the specific nature of the problem being addressed, but also the different user requirements on the algorithm. The domain-specific nature of the problem, together with the user requirements, guides the search in converging toward configurations suitable for the problem scenarios.

Practical Applicability

The present invention has wide-ranging practical applicability. There are many problems in real-life scenarios which can be transformed to combinatorial optimization problems. As an example of the utility of the present invention as a problem-solving environment and algorithm optimizer in an application with industrial relevance, an embodiment of the present invention was used to generate and optimize a hybrid genetic algorithm. The algorithm was subsequently integrated into a supply chain management workflow. The hybrid GA served as the planning and scheduling engine to manage the distribution of fuels by a fleet of trucks to retail outlets (refueling stations for motorists). Each retail outlet submits an order or request for the type and quantity of fuels for replenishing.

We termed the overall planner a fuel truck dispatch system (FTDS). Each truck has a limited capacity. It carries only a limited amount of fuels for dispatch to the various stations in a given zone, starting from a designated depot or distribution centre. The main objective of optimization is to minimize the dispatch cost, which is usually measured by the overall traveling distance or time. FTDS helps a human planner to generate a set of routes for the fuel trucks. Besides the limitation of truck capacity, there usually are more constraints, such as time factor (delivery within a specified time window) and priority of service, which need to be taken into account.

We configured a hybrid genetic algorithm and generated the corresponding source codes with the system described in PCT/SG2006/000383 After incorporating the problem's domain specific features, such as the truck and station information, distance information etc., an alpha version of the scheduler was achieved in a fairly short time. With conventional approach of system development, coding cycle for the algorithm may require weeks or even months.

To improve on that algorithm, we used the present invention to generate and optimize a hybrid genetic algorithm and tested it on a set of benchmarks of a well known combinatorial optimization problem, namely the quadratic assignment problem. The algorithm produced by the present invention was able to achieve human competitive and even better results compared with most recently reported methods in literature.

One learning process carried out using the invention employed a configuration setting file which consisted of parameters to control the learning process as well as instances of the optimization problem to be used in the training process.

The parameters used were:

Algorithm_Pool_Size
This refers to the size of the population pool; each individual in the pool represents a candidate algorithm structure. In the implementation, 10 algorithms were configured and evaluated for each iteration of the learning process.

Archive_Size
The Archive_Size value specifies the number of algorithms to be maintained. They correspond to the best algorithms uncovered during the learning process. The automatic configuration engine sorts the algorithms in order of their performance levels. In the implementation a value of 10 was used.

Max_Iteration
This specifies the maximum number of iterations to run the learning process. In the implementation a value of 100 was used.

Number_Of_Trials_For_Each_Algorithm
This parameter specifies the number of trials to run each algorithm during the evaluation process. Since the algorithms are stochastic in nature, multiple trial runs are carried out to derive an indicative average performance level. In the implementation a value of 10 was used.

How_Many_Top_Algorithm_To_Update_Trace
This specifies the number of best performing algorithms in the archive allowed to update the trace values in the tree. This value of this parameter shall not exceed Archive_Size. In the implementation a value of 3 was used.

Each_Instance_Train_For_How_Many_Iterations
This parameter specifies the number of successive iterations during training for each instance of the training set. The instances in the training set are chosen in a random order. In the implementation a value of 2 was used.

Initial_Amount_Of_Trace
This specifies the initial amount of trace value at every "split traversal node". In the implementation a value of 20.0 was used.

The training set consisted of four instances (referred to as kra30b.dat, nug30.dat, tai40a.dat and chr25a.dat) of the widely known benchmark dataset for quadratic assignment problem (QAP).

Although only a single embodiment of the invention has been described in detail many variations are possible within the scope of the invention, as will be clear to a skilled reader.

The invention claimed is:

1. A method of obtaining a set of probabilistic functions for configuring a search algorithm including one or more procedural components, said method comprising:
   (a) providing for each procedural component a corresponding data structure representing options for configuring the procedural component, each data structure comprising a plurality of nodes associated together in a tree structure, a plurality of said nodes being traversal split nodes representing respective choices which are to be made to configure the corresponding procedural component, the traversal split nodes being associated with one of the probabilistic functions;
   (b) selecting current probabilistic functions;
   (c) producing one or more candidate algorithms, each candidate algorithm being produced by traversing the tree structures by performing a traversal algorithm in which a plurality of said nodes are labeled successively as a current node, and, upon the current node being a traversal split node, performing the associated current probabilistic function to make the choice represented by the current node, wherein the probabilistic function associated with each traversal split node is defined by a respective set of one or more numerical trace values, said set of one or more numerical trace values being associated with a plurality of branches representing routing options through said tree structure, wherein the set of numerical trace values guides the decision of choosing one branch of the plurality of branches at the traversal split node;
   (d) evaluating the candidate algorithms by forming for each candidate algorithm a respective quality index; and
   (e) obtaining modified probabilistic functions based on the quality indices and returning to step (c) until a termination criterion is met, wherein the modified probabilistic functions are obtained by adjusting a relative weight of the numerical trace values associated with the plurality of branches at the traversal split node, based on numeric trace values of at least one of the traversal split nodes chosen by one of the candidate algorithms and its quality index in the current iteration, to modify the probability of the branch being chosen in the next iteration by returning to step (c) to produce candidate algorithms using the adjusted numerical trace values;
   wherein said search algorithm is a search algorithm for solving a combinatorial-optimization problem and said quality index is representative of the quality of performance of the combinatorial-optimization problem by the corresponding candidate algorithm.

2. The method according to claim 1 wherein at least some of said traversal split nodes are variation nodes at which the associated probabilistic function selects one of a plurality of routing options for traversing the corresponding tree structure.

3. The method according to claim 1 wherein at least some of said traversal split nodes are nodes at which the associated probabilistic function selects one of a plurality of options for setting a numerical parameter.

4. The method according to claim 1 wherein said step (d) includes running the candidate algorithms to solve a set of one or more test problems, and evaluating the quality of one or more solutions the candidate algorithms produce.

5. The method according to claim 4 wherein the quality of said one or more solutions is evaluated using a user-defined quality function.

6. A method of configuring a search algorithm, the method comprising performing the method according to claim 1 to generate a set of probabilistic functions, and then selecting at least one of the evaluated candidate algorithms to be used as a search algorithm to solve an actual optimization problem.

7. The method according to claim 6 wherein said evaluating step (d) employs a test set of problems of which the actual optimization problem is statistically typical.

8. The method according to claim 6 further comprising generating source code implementing the configured search algorithm.

9. A method of configuring a search algorithm for solving a combinatorial-optimization problem, the search algorithm including one or more procedural components, said method comprising:
(a) providing for each procedural component a corresponding data structure representing options for configuring the procedural component, each data structure comprising a plurality of nodes associated together in a tree structure, a plurality of said nodes being traversal split nodes representing respective choices which are to be made to configure the corresponding procedural component, the traversal split nodes being associated with one of a set of probabilistic functions;
(b) selecting current probabilistic functions;
(c) producing one or more candidate algorithms, each candidate algorithm being produced by traversing the tree structure by performing a traversal algorithm in which a plurality of said nodes are labeled successively as a current node, and, upon the current node being a traversal split node, performing the associated current probabilistic function to make the choice represented by the current node, wherein the probabilistic function associated with each traversal split node is defined by a respective set of one or more numerical trace values, said set of one or more numerical trace values being associated with a plurality of branches representing routing options through said tree structure, wherein the set of numerical trace values guides the decision of choosing one branch of the plurality of branches at the traversal split node;
(d) evaluating the candidate algorithms by forming for each candidate algorithm a respective quality index representative of the quality of performance of the combinatorial-optimization problem by the corresponding candidate algorithm;
(e) obtaining modified probabilistic functions based on the quality indices and returning to step (c) until a termination criterion is met, wherein the modified probabilistic functions are obtained by adjusting a relative weight of the numerical trace values associated with the plurality of branches at the traversal split node, based on numeric trace values of at least one of the traversal split nodes chosen by one of the candidate algorithms and its quality index in the current iteration, to modify the probability of the branch being chosen in the next iteration by returning to step (c) to produce candidate algorithms using the adjusted numerical trace values; and
(f) upon the termination criterion being met, configuring a search algorithm for solving the combinatorial-optimization problem based on one of the said candidate algorithms.

10. The method according to claim 9 further comprising generating source code implementing the configured search algorithm.

11. A computer system arranged to configure a search algorithm for solving a combinatorial-optimization problem, the search algorithm including one or more procedural components, the computer system comprising:
a processor arranged to employ for each procedural component a corresponding data structure representing options for configuring the procedural component, each data structure comprising a plurality of nodes associated together in a tree structure, a plurality of said nodes being traversal split nodes representing respective choices which are to be made to configure the corresponding procedural component, the traversal split nodes being associated with respective ones of a set of probabilistic functions, said processor being arranged to perform a set of steps comprising:
(a) selecting current probabilistic functions;
(b) producing one or more candidate search algorithms, each candidate search algorithm being produced by traversing the tree structure by performing a traversal algorithm in which a plurality of said nodes are labeled successively as a current node, and, upon the current node being a traversal split node, performing the associated current probabilistic function to make the choice represented by the current node, wherein the probabilistic function associated with each traversal split node is defined by a respective set of one or more numerical trace values, said set of one or more numerical trace values being associated with a plurality of branches representing routing options through said tree structure, wherein the set of numerical trace values guides the decision of choosing one branch of the plurality of branches at the traversal split node,
(c) evaluating the candidate search algorithms by forming for each candidate algorithm a respective quality index representative of the quality of performance of the combinatorial-optimization problem by the corresponding candidate algorithm;
(d) obtaining modified probabilistic functions based on the quality indices, wherein the modified probabilistic functions are obtained by adjusting a relative weight of the numerical trace values associated with the plurality of branches at the traversal split node, based on numeric trace values of at least one of the traversal split nodes chosen by one of the candidate algorithms and its quality index in the current iteration, to modify the probability of the branch being chosen in the next iteration by returning to step (b) to produce candidate algorithms using the adjusted numerical trace values; and
(e) returning to step (b) until a termination criterion is met.

12. A non-transitory computer-readable medium containing computer program instructions operative, upon being read by a computer system, to cause the computer system to configure a search algorithm for solving a combinatorial-optimization problem, the search algorithm including one or more procedural components, said program instructions causing a processor of the computer system to employ for each procedural component a corresponding data structure representing options for configuring the procedural component, each data structure comprising a plurality of nodes associated together in a tree structure, a plurality of said nodes being traversal split nodes representing respective choices which are to be made to configure the corresponding procedural component, the traversal split nodes being associated with respective ones of a set of probabilistic functions, said program instructions causing said processor to perform a set of steps comprising:
(a) selecting current probabilistic functions;
(b) producing one or more candidate search algorithms, each candidate search algorithm being produced by traversing the tree structure by performing a traversal algorithm in which a plurality of said nodes are labeled successively as a current node, and, upon the current node being a traversal split node, performing the associated current probabilistic function to make the choice represented by the current node, wherein the probabilistic function associated with each traversal split node is defined by a respective set of one or more numerical trace values, said set of one or more numerical trace values being associated with a plurality of branches representing routing options through said tree structure, wherein the set of numerical trace values guides the decision of choosing one branch of the plurality of branches at the traversal split node, (c) evaluating the candidate search algorithms by forming for each candidate algorithm a respective quality index representative of the quality of performance of the combinatorial-optimization problem by the corresponding candidate algorithm, and (d) obtaining modified probabilistic functions based on the quality indices and returning to step (b) until a termination criterion is met, wherein the modified probabilistic functions are obtained by adjusting a relative weight of the numerical trace values associated with the plurality of branches at the traversal split node, based on numeric trace values of at least one of the traversal split nodes chosen by one of the candidate algorithms and its quality index in the current iteration, to modify the probability of the branch being chosen in the next iteration by returning to step (b) to produce candidate algorithms using the adjusted numerical trace values.

13. A computer system arranged to obtain a set of probabilistic functions for configuring a search algorithm for solving a combinatorial-optimization problem, the search algorithm including one or more procedural components, the computer system having a processor arranged to employ for each procedural component a corresponding data structure representing options for configuring the procedural component, each data structure comprising a plurality of nodes associated together in a tree structure, a plurality of said nodes being traversal split nodes representing respective choices which are to be made to configure the corresponding procedural component, the traversal split nodes being associated with respective ones of the probabilistic functions, said processor being arranged to perform a set of steps comprising:

(a) selecting current probabilistic functions;

(b) producing one or more candidate algorithms, each candidate algorithm being produced by traversing the tree structures by performing a traversal algorithm in which a plurality of said nodes are labeled successively as a current node, and, upon the current node being a traversal split node, performing the associated current probabilistic function to make the choice represented by the current node, wherein the probabilistic function associated with each traversal split node is defined by a respective set of one or more numerical trace values, said set of one or more numerical trace values being associated with a plurality of branches representing routing options through said tree structure, wherein the set of numerical trace values guides the decision of choosing one branch of the plurality of branches at the traversal split node;

(c) evaluating the candidate algorithms by forming for each candidate algorithm a respective quality index representative of the quality of performance of the combinatorial-optimization problem by the corresponding candidate algorithm; and (d) obtaining modified probabilistic functions based on the quality indices, wherein the modified probabilistic functions are obtained by adjusting a relative weight of the numerical trace values associated with the plurality of branches at the traversal split node, based on numeric trace values of at least one of the traversal split nodes chosen by one of the candidate algorithms and its quality index in the current iteration, to modify the probability of the branch being chosen in the next iteration by returning to step (b) to produce candidate algorithms using the adjusted numerical trace values, and (e) returning to step (b) until a termination criterion is met.

14. A non-transitory computer-readable medium containing computer program instructions operative, upon being read by a computer system, to cause the computer system to obtain a set of probabilistic functions for configuring a search algorithm for solving a combinatorial-optimization problem, the search algorithm including one or more procedural components, said program instructions causing a processor of the computer system to employ for each procedural component a corresponding data structure representing options for configuring the procedural component, each data structure comprising a plurality of nodes associated together in a tree structure, a plurality of said nodes being traversal split nodes representing respective choices which are to be made to configure the corresponding procedural component, the traversal split nodes being associated with respective ones of the probabilistic functions, said program instructions causing said processor to perform a set of steps comprising:

(a) selecting current probabilistic functions;

(b) producing one or more candidate algorithms, each candidate algorithm being produced by traversing the tree structures by performing a traversal algorithm in which a plurality of said nodes are labeled successively as a current node, and, upon the current node being a traversal split node, performing the associated current probabilistic function to make the choice represented by the current node, wherein the probabilistic function associated with each traversal split node is defined by a respective set of one or more numerical trace values, said set of one or more numerical trace values being associated with a plurality of branches representing routing options through said tree structure, wherein the set of numerical trace values guides the decision of choosing one branch of the plurality of branches at the traversal split node;

(c) evaluating the candidate algorithms by forming for each candidate algorithm a respective quality index representative of the quality of performance of the combinatorial-optimization problem by the corresponding candidate algorithm;

(d) obtaining modified probabilistic functions based on the quality indices, wherein the modified probabilistic functions are obtained by adjusting a relative weight of the numerical trace values associated with the plurality of branches at the traversal split node, based on numeric trace values of at least one of the traversal split nodes chosen by one of the candidate algorithms and its quality index in the current iteration, to modify the probability of the branch being chosen in the next iteration by returning to step (b) to produce candidate algorithms using the adjusted numerical trace values, and (e) returning to step (b) until a termination criterion is met.

* * * * *